US010878428B1

(12) United States Patent
Comeaux et al.

(10) Patent No.: US 10,878,428 B1
(45) Date of Patent: Dec. 29, 2020

(54) SYSTEMS AND METHODS FOR GENERATION OF ALERTS BASED ON FRAUDULENT NETWORK ACTIVITY

(71) Applicant: UIPCO, LLC, San Antonio, TX (US)

(72) Inventors: Jansey Comeaux, Youngsville, TX (US); Stephen Bradley Daughdrill, San Antonio, TX (US); Gregory Sansone, San Antonio, TX (US); Veronica Santiago, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 438 days.

(21) Appl. No.: 15/973,849

(22) Filed: May 8, 2018

Related U.S. Application Data

(60) Provisional application No. 62/503,782, filed on May 9, 2017.

(51) Int. Cl.
*G06Q 30/00* (2012.01)
(52) U.S. Cl.
CPC .............................. *G06Q 30/0185* (2013.01)
(58) Field of Classification Search
CPC ............ G06Q 30/0185; H04L 63/1416; G08B 21/182
See application file for complete search history.

(56) References Cited

U.S. PATENT DOCUMENTS

| 10,567,402 | B1* | 2/2020 | Comeaux | H04L 63/14 |
| 10,572,884 | B1* | 2/2020 | Comeaux | G06N 5/003 |
| 2003/0147516 | A1* | 8/2003 | Lawyer | H04M 15/41 |
| | | | | 379/114.14 |
| 2010/0094767 | A1* | 4/2010 | Miltonberger | G06Q 10/10 |
| | | | | 705/325 |
| 2015/0073981 | A1* | 3/2015 | Adjaoute | G06Q 30/0225 |
| | | | | 705/39 |
| 2017/0251007 | A1* | 8/2017 | Fujisawa | H04L 63/1425 |
| 2018/0033009 | A1* | 2/2018 | Goldman | G06Q 40/10 |
| 2019/0073647 | A1* | 3/2019 | Zoldi | G06Q 30/0601 |
| 2019/0261222 | A1* | 8/2019 | Raleigh | H04M 15/66 |

OTHER PUBLICATIONS

User Profiling for Fraud Detection in Telecommunication Networks; Hilas et al.; 7 pages (Year: 2005).*
Rieke Roland, "Fraud Detection in Mobile Payments Utilizing Process Behavior Analysis", (Year: 2013) (Year: 2013).*

* cited by examiner

*Primary Examiner* — Dennis W Ruhl
(74) *Attorney, Agent, or Firm* — Perkins Coie LLP

(57) ABSTRACT

Disclosed herein are systems and methods executing a server that perform various processes for generating alerts containing various data fields indicating threats of fraud or attempts to penetrate an enterprise network. Analyst computers may query and fetch alerts from a database, and then present the alerts to be addressed by an analyst according to the priority level of the respective alerts.

20 Claims, 2 Drawing Sheets

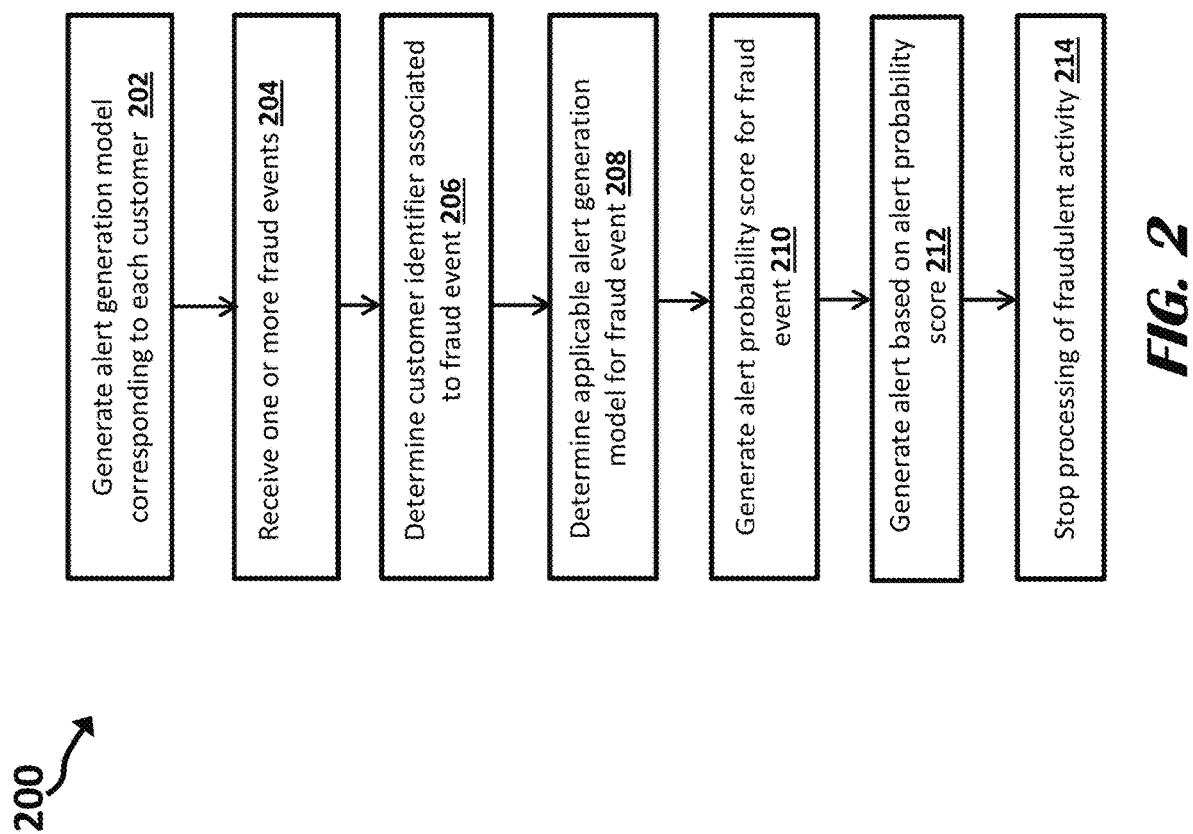

SYSTEMS AND METHODS FOR GENERATION OF ALERTS BASED ON FRAUDULENT NETWORK ACTIVITY

CROSS-REFERENCE TO RELATED FILINGS

This application claims priority to U.S. Provisional Application No. 62/503,782, filed May 9, 2017, which is hereby incorporated by reference in its entirety.

TECHNICAL FIELD

This application relates generally to systems, apparatus, and methods for risk assessment and alert generation based on fraudulent and malicious network activity in an enterprise system.

BACKGROUND

Organizations strive to ensure secure and convenient user access to services or accounts. With the proliferation of identity theft, organizations that are especially vulnerable to fraudulent activity, such as the banking and insurance industries, need tools to detect, investigate, analyze, and prevent fraud as accurately and efficiently as possible. However, organizations in the relevant industries are faced with the daunting task of analyzing millions of transactions and documents to detect external and internal fraudulent activity.

To combat fraud or other malicious behaviors, some organizations employ modern enterprise networks that utilize conventional fraud detection models to indicate potential malicious behavior, through a variety of channels. The development of these traditional fraud detection models typically requires a long period of time, and subsequent trainings upon model degradation may further leverage human capacity. This lengthy process of the development and training limits the amount of real-time insight that can be leveraged in the fraud detection model. Particularly for a security based purposes, such fraud detection model creates vast limitations as the threats are constantly adapting and such threats are not accounted for in these fraud detection models.

SUMMARY

Based on the afore-mentioned reasons, it is clear that the current fraud analytics techniques are neither efficient nor accurate enough. Therefore, there is a need for an improvement to the fraud detection techniques to efficiently and timely capture potential threat or vulnerability information since a typical organization may otherwise be at risk of losing millions of dollars of its revenues to fraudulent activity.

Disclosed herein are systems and methods capable of addressing the above-described shortcomings and may also provide any number of additional or alternative benefits and advantages. As described herein, embodiments of the present disclosure relate to systems, apparatuses, methods, and computer program products for integrated risk assessment and management by detecting probable fraudulent and malicious network activity, and subsequently generating alerts to prevent the execution of fraudulent and malicious network activity. Such systems, apparatuses, methods, and computer program products maximize fraud loss prevention by using models that learns from evolving fraud trends, increases speed of fraud detection by dynamically re-evaluating risk factors as new information becomes available, increases the available capacity of fraud detection systems by reducing false positives, and lastly provide scalable solution to serve growing membership with available fraud detection systems.

Various devices of the present disclosure may provide security solutions by identifying fraudulent and malicious network activity, and then generating alerts to address the identified fraudulent and malicious events. For example, various devices hosting an enterprise website may be configured to report failed login attempts from a user, while firewalls may report blocked data traffic arriving from untrusted Internet Protocol (IP) addresses. The devices may then produce alerts containing potential threat or vulnerability information associated with their respective channels. These alerts may be assigned to a fraud analyst who is tasked with addressing the alerts. In a fraud detection context within a financial institution enterprise network, these alerts can often be associated with a user, where fraud analysts can sometimes identify an attack theme or scenario across the alerts, and provide their learning inputs based on these themes or scenarios to train the fraud detection models in order to reduce the detection of false events in the future.

In an embodiment, a server-implemented method may include generating, by a server, an alert-generation model corresponding to each user using at least data from a behavior profile of each user where the behavior profile of the user comprises at least a record of events previously undertaken by the user in an account of the user. The server-implemented method may further include receiving, by a server, one or more fraud events from one or more fraud detection devices where each of the one or more fraud events comprises data fields associated a fraudulent activity. The server-implemented method may further include determining, by the server, a user identifier associated with a fraud event of the one or more fraud events based on the data associated with the fraudulent activity. The server-implemented method may further include determining, by the server, the alert-generation model applicable to the fraud event based on the user identifier associated with the fraud event. The server-implemented method may further include generating, by the server, an alert probability score corresponding to the fraud event, based on the execution of the alert-generation model applicable to the fraud event determined based on the user identifier associated with the fraud event, on the data fields associated with the fraudulent activity contained in the fraud event. The server-implemented method may further include generating, by the server, an alert associated with the fraud event upon determining that the alert probability score corresponding to the fraud event exceeds a pre-defined threshold score. The server-implemented method may further include, upon the server generating the alert for the fraudulent activity, the server-implemented method may further include generating, by the server, one or more instructions to cease execution of a request associated with the fraudulent activity; and updating, by the server, the behavior profile of the user with a record of fraud event in the account of the user, whereby the server trains the alert-generation model using the updated behavior profile.

In another embodiment, a system may include a server configured to generate an alert-generation model corresponding to each user using at least data from a behavior profile of each user where the behavior profile of the user comprises at least a record of events previously undertaken by the user in an account of the user. The server may be further configured to receive one or more fraud events from one or more fraud detection devices where each of the one or more fraud events comprises data fields associated a fraudulent activity. The server may be further configured to determine a user identifier associated with a fraud event of the one or more fraud events based on the data associated with the fraudulent activity. The server may be further configured to determine the alert-generation model applicable to the fraud event based on the user identifier associated with the fraud event. The server may be further configured to generate an alert probability score corresponding to the fraud event, based on the execution of the alert-generation model applicable to the fraud event determined based on the user identifier associated with the fraud event, on the data fields associated with the fraudulent activity contained in the fraud event. The server may be further configured to generate an alert associated with the fraud event upon determining that the alert probability score corresponding to the fraud event exceeds a pre-defined threshold score. Upon the server generating the alert for the fraudulent activity: the server may be further configured to generate one or more instructions to cease the execution of a request of the fraudulent activity; and update the behavior profile of the user with a record of fraud event by the user in the account of the user, whereby the server trains the alert-generation model using the updated behavior profile.

In another embodiment, a server-implemented method may include generating, by a server, an alert-generation model corresponding to each user using at least data from a behavior profile of each user where the behavior profile of the user comprises at least a record of events previously undertaken by the user in an account of the user. The server-implemented method may further include receiving, by the server, one or more fraud events comprising one or more fraud indicators associated with a fraudulent activity from one or more fraud detection devices where each of the one or more fraud detection devices executes one or more fraud detection algorithms to identify data fields associated with the one or more fraud indicators based on one or more fraud scenarios. The server-implemented method may further include determining, by the server, a user identifier associated with each fraud event based on the data fields associated with the fraudulent activity. The server-implemented method may further include determining, by the server, the alert-generation model applicable to each fraud event based on the user identifier associated with each fraud event. The server-implemented method may further include generating, by the server, the alert probability score corresponding to each fraud event, based on the execution of the alert-generation model applicable to each fraud event determined based on the user identifier associated with each fraud event, on the data fields associated with the fraudulent activity contained in each fraud event. The server-implemented method may further include updating, by the server, the one or more fraud detection algorithms by modifying the one or more fraud scenarios based on the alert probability score corresponding to each fraud event. The server-implemented method may further include generating, by the server, an alert associated with the fraud event upon determining that the alert probability score corresponding to the fraud event exceed a pre-defined threshold score. The server-implemented method may further include, upon the server generating the alert for the fraudulent activity: generating, by the server, one or more instructions to cease execution of a request associated with the fraudulent activity; and updating, by the server, the behavior profile of the user with a record of fraud event in the account of the user, whereby the server trains the alert-generation model using the updated behavior profile.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments that, together with the specification, explain the subject matter.

FIG. 2 shows execution of a method for generating alerts based on fraudulent and malicious network activity, according to an exemplary embodiment.

DETAILED DESCRIPTION

Figure 1:
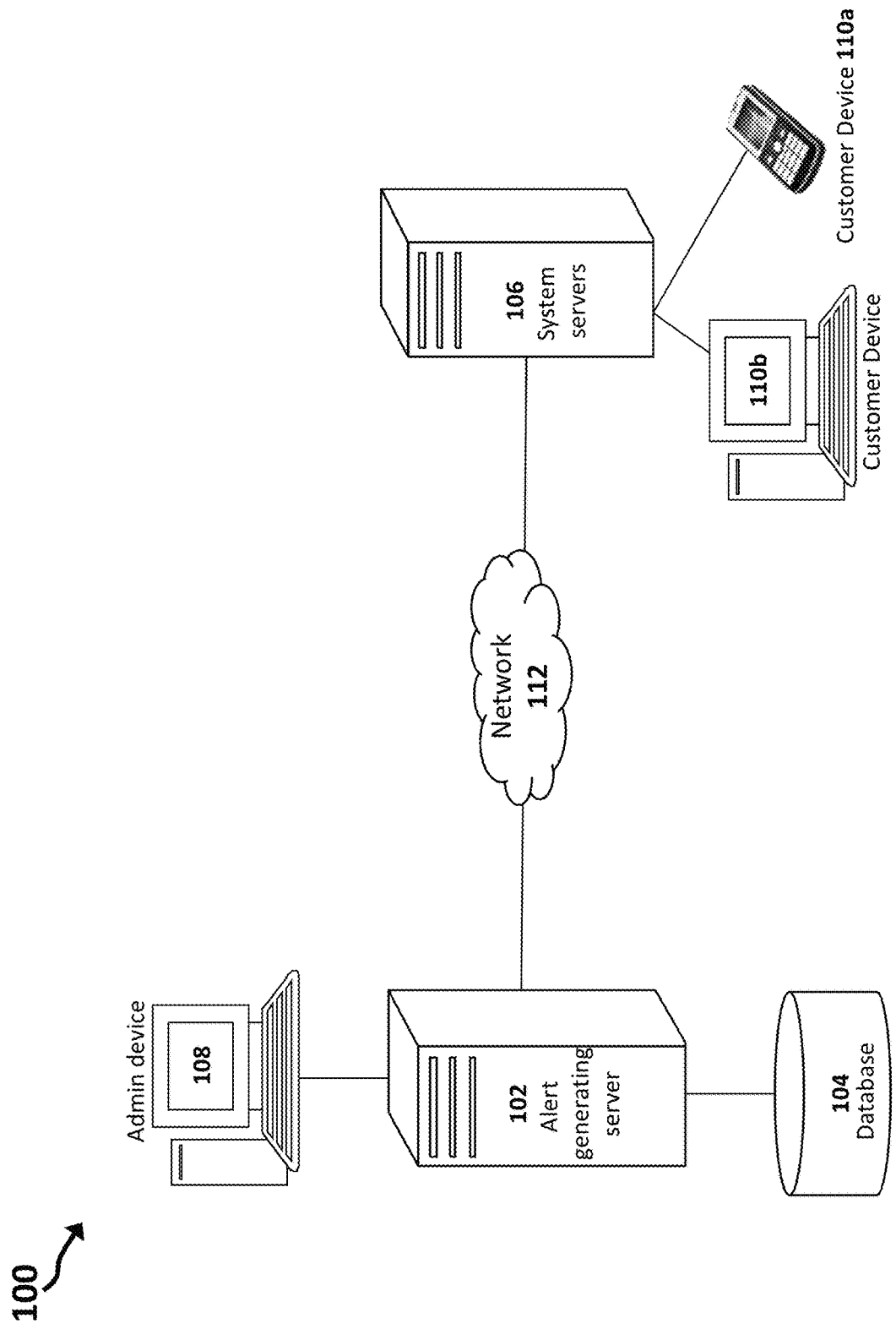
FIG. 1 shows components of a system for generating alerts based on fraudulent and malicious network activity, according to an exemplary embodiment.

The present disclosure described herein reference potential embodiments illustrated in the drawings. Other embodiments or changes to embodiments may be used, made, or described herein, without departing from the spirit or scope of the present disclosure. It should be appreciated that the illustrative embodiments described in the detailed description are not meant to be limiting of the subject matter presented here.

Alert-generating systems and apparatuses described herein generate alerts based on inputs from one or more servers that are operable to track, monitor, and flag for potentially fraudulent and malicious network activity. The alerts may contain various data fields indicating threats of fraud or attempts to penetrate an enterprise network, and indicating one or more particular users of the system associated with an alert (often the target of a type of fraud). Hereinafter, the term "customers," "clients," "members," and "users" may be interchangeably used. The alerts may be stored into a system database to wait further processing.

To generate alerts, the alert-generating systems and apparatuses may perform various processes on user actions (events), such as determining whether the user events contain attributes matching attributes of one or more known and unknown fraud scenarios. The alert-generating systems and apparatuses may execute one or more alert generation models that generate a fraud probability score for apparent fraudulent events. The alert generation models may employ machine-learning techniques to differentiate user behavioral attributes and contemporaneous trends from true malicious events. For instance, the alert generation models may use algorithms and computational methods that allow alert-generating systems and apparatuses to discover patterns in data of apparent fraudulent events, without being explicitly programmed to find said patterns. The methodology involves a learning phase, in which alert-generating systems and apparatuses learns by experience with a data sample, creates a corresponding alert generation model, and, if the alert generation model is further validated, continues to use and improve upon the alert generation model for future validation of apparent fraudulent events. This allows the alert generation model to automatically validate new events and tune itself accordingly.

The alert-generating systems and apparatuses may sort the fraudulent events according to a priority, based on the relative fraud probability scores. Periodically or in response to a triggering condition, the alert-generating systems and apparatuses may also update the fraud probability scores of the fraudulent events as more fraudulent events are detected and received from one or more fraud detection servers. Based on the analysis of these fraudulent events and their associated fraud probability scores, the alert-generating systems and apparatuses generate alerts to avoid the fraud for occurring. Analyst computers may query and fetch these alerts from a database and may present the alerts to be addressed by an analyst, for example, according to a priority level of the respective alerts.

Reference made to the exemplary embodiments illustrated in the drawings, and the specific language used herein to describe the same, are not necessarily intended as limitations of the scope of this disclosure. Alterations and further modifications of the inventive features illustrated and described herein, and additional applications of the principles of the subject matter of the disclosure, occurring to one skilled in the relevant art and having possession of this disclosure, should be considered within the scope of the disclosure.

FIG. 1 shows components of a system 100 for generating alerts based on fraudulent and malicious network activity, according to an exemplary embodiment. The system 100 may include alert-generating servers 102, databases 104, system servers 106, analyst devices 108, and user devices 110. For ease of explanation, FIG. 1 shows each component of the system 100 functioning as a single device. However, it should be appreciated that some embodiments may comprise any number of devices capable of performing the various tasks described herein.

The alert-generating servers 102, the databases 104, the system servers 106, the analyst devices 108, and the user devices 110 are connected to each other through one or more networks 112. The examples of the network 112 may include, but are not limited to, private or public LAN, WLAN, MAN, WAN, and the Internet. The network 112 may also include both wired and wireless communications according to one or more standards and/or via one or more transport mediums. The communication over the network 112 may be performed in accordance with various communication protocols such as Transmission Control Protocol and Internet Protocol (TCP/IP), User Datagram Protocol (UDP), and IEEE communication protocols. In one example, the network 112 may include wireless communications according to Bluetooth specification sets, or another standard or proprietary wireless communication protocol. In another example, the network 112 may also include communications over a cellular network, including, e.g., a GSM (Global System for Mobile Communications), CDMA (Code Division Multiple Access), and EDGE (Enhanced Data for Global Evolution) network.

Alert-generating servers 102 may be any computing devices comprising a processor, and a non-transitory machine-readable storage medium, and capable of performing various tasks and processes described herein during execution. Non-limiting examples of the alert-generating servers 102 may include a desktop computer, a server computer, a laptop computer, a tablet computer, and the like. For ease of explanation, FIG. 1 shows a single computing device functioning as the alert-generating server 102. However, it should be appreciated that some embodiments may comprise any number of computing devices capable of performing the various tasks described herein.

The alert-generating server 102 may be coupled to one or more system servers 106 via one or more internal or external networks 112. The alert-generating server 102 may receive log files or other machine-readable code containing various data fields describing a detected fraudulent and malicious event associated with a data channel from various types of system servers 106 such as a payment server, a webserver, a security device, a network appliance, and other devices. For example, a system server 106 may detect an authentication-failure event upon receiving improper authentication credentials from a user device 110.

The system server 106 may transmit data corresponding to the authentication-failure event to the alert-generating server 102. The data of the authentication-failure event may contain information describing a source device and a particular user account the user was attempting to access. Upon receiving the data corresponding to the authentication-failure event, the alert-generating server 102 may associate the data corresponding to the authentication-failure event with a user account based on the data corresponding to the authentication-failure event. The data corresponding to the authentication-failure event may, for example, contain a data field indicating a user identifier value that is unique to the user. The alert-generating server 102 may store data corresponding to the authentication-failure event into a database 104 and may generate an alert for the user identifier, where the alert is a log file or any other machine-readable code containing data fields that are populated with data that is based on the authentication-failure event associated with the same user identifier.

The alert-generating server 102 may execute various processes on incoming fraudulent and malicious event received from various types of the system servers 106, such as formatting of data files corresponding to the fraudulent and malicious event, identifying an associated user, or determining a particular scenario having attributes matched to the event. In some implementations, the alert-generating server 102 may comprise a set of one or more scenario attribute models that may indicate to the alert-generating server 102 whether a detected fraudulent and malicious event is a particular type of fraud or attack.

Scenario models may be computer files stored on the alert-generating server 102 or separate database device, such as a database 104, and comprise a set of attributes that indicate a type of scenario of potential fraud or attack. In such implementations, the alert-generating server 102 may identify data field entries in the incoming fraudulent and malicious events to identify one or more matches to corresponding attributes in the scenario models. In some cases, the alert-generating server 102 may generate an alert upon receiving and identifying that a fraudulent and malicious event matches a particular scenario. To tailor which events or types of events trigger the alert-generating server 102 processing, the alert-generating server 102 may dismiss or otherwise delete an event from the database 104 when the alert-generating server 102 does not identify a scenario having attributes that capture a threshold number of data fields in the event.

The alert-generating server 102 may generate an alert-generation model and/or algorithm configured to determine an alert probability score for each fraudulent and malicious event. The alert-generation model and/or algorithm may receive an input of a learning algorithm dataset. The learning algorithm dataset may be used to generate and train the alert-generation model and/or algorithm. The alert-generation model and/or algorithm dataset may include data associated with the scenario models. The scenario model may be computer files stored in the database 104 and may comprise a set of alert element attributes that indicate a type of scenario of potential fraud or attack.

In some embodiments, all scenario models may correspond to scenarios, which may be associated with a different rate of a particular type of fraud or attack. For instance, all scenario models may be associated with a different percentage of a particular type of fraud or attack depending on a type of scenario of potential type of fraud or attack. In one example, a first scenario model may be associated with a particular type of fraud corresponding to suspicious ATM money withdrawal in a foreign city for a particular user that resides in a city (e.g., New York) in the United States. If the foreign city where suspicious ATM money withdrawal happened is outside of New York but within the United States, then the execution of the first scenario model will indicate that a rate of fraud associated with such a case is less than 50 percent. However, if the foreign city where suspicious ATM money withdrawal happened is outside of the United States, then the execution of the first scenario model will indicate that a rate of fraud associated with such a case is more than 50 percent. In some embodiments, each scenario model may be associated with a different rate of a particular type of fraud or attack. For instance, each scenario model may be associated with a different percentage of a particular type of fraud or attack depending on a type of scenario of potential type of fraud or attack.

The alert-generating server 102 may periodically query the database 104 to receive updated data associated with the scenario model. The database 104 may be a model database configured to store the data/information associated with the scenario model. The alert-generating server 102 may then iteratively update the alert-generation model and/or algorithm dataset based on any updated data associated with the scenario model.

The alert-generating server 102 may then determine an alert probability score for each detected fraudulent and malicious event (determined based on scenario models). The alert probability score of the fraudulent and malicious event is determined based on the alert-generation model that the alert-generating server 102, or any other server of the system 100, applies to the data fields of the fraudulent and malicious events. The alert-generating server 102 may determine an alert probability score for each fraudulent and malicious event based on an alert-generation model and/or algorithm such as a non-linear statistical data model that calculates the alert probability score associated with the fraud or attack. Such non-linear statistical data models may include neural networks, decision trees, Bayesian networks, genetic algorithms, and several other types of non-linear statistical data models.

In some embodiments, the alert-generating server 102 may determine an alert probability score for each fraudulent and malicious event using the alert-generation model, which is based at least on a behavior profile of a user associated with fraudulent and malicious event. The alert-generation model may use algorithms and computational methods that allow the alert-generating server 102 to discover patterns in data of apparent fraudulent and malicious event and/or behavior profile of users. The methodology involves a learning phase, in which the alert-generating server 102 learns by experience with a data sample of fraudulent and malicious event and/or behavior profile of users, creates and/or updates the alert-generation model, and, if the alert-generation model is further validated, continues to execute and improve upon the alert-generation model for future validation of fraudulent and malicious events. The learning phase methodology employed by the alert-generating server 102 allows the alert-generation model to automatically validate new fraudulent and malicious events and revise itself accordingly.

The alert-generating server 102 may employ one or more statistical tools and one or more artificial intelligence methods to generate an alert-generation model based on existing data. The alert-generating server 102 may also train the alert-generation model based on known malicious and/or benign network activity identified. For example, the alert-generation server 102 may use an artificial neural networks technique to generate and train the alert-generation model. A neural network may include an interconnected group of artificial neurons where each neuron may represent a user attribute. For example, each neuron may represent one attribute associated with a user stored within the user profile in database 104. Non-limiting examples of user attributes may include unique identifier of user device, number of login attempts, number of transactions per month, time and date associated with transactions, amount of transactions, and the like. The alert-generation server 102 may then generate the alert-generation model based on the neural network. The alert-generation model may represent a mathematical or computational model comprising mathematical functions describing the relationship between each neuron within the neural network using include "weight" and 'bias" factors. The alert-generation model may also comprise a mathematical function describing how the neurons are divided into one or more layers.

The alert-generating server 102 may execute the alert-generation model to infer whether user's network activity is fraudulent or whether the user's account has been compromised. The alert-generation model is particularly useful in fraud detection applications where the complexity and the volume of the data make manual fraud-detection impractical, inefficient, and time-consuming. As described above, when evaluation network activity, time is an important factor because a fraudster may only need t a brief window of time to compromise a valid user account.

As the alert-generating server 102 encounters new fraudulent network activities, the alert-generating server 102 may train the alert generation model to "learn" new fraudulent behavior and attributes. When encountered with new fraudulent data, the alert generation model may reconfigure itself to adapt to new fraudulent behavior, which leads to a more accurate identification of fraudulent activities. In operation, when the alert-generating server 102 identifies new fraudulent network activity, the alert-generating server 102 may transmit data associated with the new fraudulent network activity to the alert-generation model in order "train" the alert generation model. As a result, the alert-generation model may use a back-propagation method to reconfigure the above-mentioned mathematical functions (e.g., weight and bias factors) and revise itself to account for the new fraudulent activity detected by the alert-generating server 102. Therefore, the alert generation model is never complete and may be iteratively trained each time new fraudulent network activity is identified. The alert-generating server 102 may use a variety of methods to train the alert-generation model, such as evolutionary algorithm methods, simulated annealing methods, expectation-maximization methods, and non-parametric methods.

In some embodiments, the alert-generating server 102 may train the alert-generation model based on known false positive fraud identification. For example, when the alert-generation model determines that a user's account has been compromised, the alert-generating model 102 may transmit a notification to an administrator who then verifies whether the user's account has indeed been compromised. Upon receiving an indication from the administrator that the alert-generation model has yielded incorrect results, the alert-generation model may then train the alert-generation model, using the above-mentioned methods, to avoid future false positives.

In a non-limiting example, the alert-generation server 102 may create a neural network comprising attributes associated with thousands of known fraudulent users' activities (e.g., users whose accounts have been compromised). The alert-generating server 102 may then create an initial alert-generation model based on the known fraudulent users' network activities. The alert-generating server 102 may execute the initial alert-generation model using a new set of data representing a new user's network activities to identify whether the new user's account has been compromised. However, because the new user may have an attribute not previously considered by the alert-generation model, the result of the execution may not be accurate. Therefore, the initial alert-generation model may need to be trained using other known fraudulent users and/or activities to achieve optimum accuracy. With each iteration of training, the alert-generation model may improve because the model considers new attributes that were not previously considered (e.g., previously not included within the neural network). In some configurations, each user within a network may have a unique alert-generation model and a neural network unique to that particular user's network activities.

In some configurations, the alert-generating server 102 may generate a behavior profile of each user and store it in the database 104. In some embodiments, the alert-generating server 102 generates a behavior profile of a user based on substantial amount of data associated with the user. The data associated with the user that may be used by the alert-generating server 102 to generate a behavior profile of the user may include, but not limited to, user personal data, user financial data, and user social network data.

In some embodiments, the alert-generating server 102 generate a behavior profile of the user based on at least the personal data of the user that may include, but not limited to, a first and last name of the user, date of birth, tax identification number, social security number, an address, including city, state and zip code, telephone number, facsimile number, e-mail address, mother's maiden name and place of birth. The personal data of the user may also include details of the user devices 110 operated by the user based on interactions between the user devices 110 and one or more servers of the system 100. Based on the one or more interactions between the user devices 110 and the one or more servers of the system 100, an IP address, device ID and/or globally unique identifier (GUID) of the user devices 110 may be obtained and then stored in a personal record of the user. GUID may be a unique reference number that may be used as an identifier of the user device 110. The value of a GUID may be presented as a 32-character hexadecimal string and is usually stored as a 128-bit integer. GUID may be used to distinguish hardware, software, networking, or a user, among others. In some embodiments, the alert-generating server 102 generate a behavior profile of the user based on at least the personal data and also the financial data of the user that may include, but not limited to, types of accounts, account balance, credit score, any known flag for activity or known fraud.

In some embodiments, the alert-generating server 102 may generate a behavior profile of the user based on the personal and financial data as well as the social media data of the user that may include, but not limited to, results of assessment of the user based on social media accounts of the users, and number and types of relationships of the user known to the enterprise. The alert-generating server 102 may crawl various databases and collect social network information of the user that is publicly available from various social networking websites, applications, and/or channels, which host a variety of data related to the user. Depending on configurations of the social networks and characteristics of the user, the user may be required to give permission to the social networks in order for the alert-generating server 102 to have access to and to capture relevant data from the social network profiles. The alert-generating server 102 harvests the social network information of the user from these social networks via automated visits to publicly available web pages of the social networks, or via public and private APIs provided for data access to the social networks. Once the social network information of the user is captured from the social networks via the alert-generating server 102, the alert-generating server 102 stores the collected data in the social data record of the user.

In operation, the alert-generating server 102 upon receiving fraudulent and malicious event from the system servers 106, may determine an alert probability score for the detected fraudulent and malicious event using an alert-generation model and/or behavior profile of a user owning an account related to the received fraudulent and malicious event. The alert-generating server 102 may generate an alert to address the fraudulent and malicious event based on the determined alert probability score for the fraudulent and malicious event. In one example, when the alert-generating server 102 determines that the data associated with the fraudulent and malicious event corresponds to a remote network logon logs of a user for suspicious access attempts, the alert-generating server 102 may apply the alert-generation model to review and flag that particular fraudulent event as non-suspicious after having determined that the user is legitimately logging in from a different geographic location based on information obtained from the behavior profile of the user.

For instance, the behavior profile of the user may include national and international travelling destinations of the user, and the alert-generation model executed by the alert-generating server 102 may use the profile information of the user to find that the different geographic location accessed by a user is included in the travelling destinations of the user, and then calculates the alert probability score for the event. In some embodiments, an alert-generation model executed by the alert-generating server 102 may learn the user's behavior over time based on new activities and/or information of the user.

In another example, the alert-generating server 102 may determine an alert probability score using an alert-generation model based on scenarios applied to the data of the fraudulent and malicious event. For instance, when a system server 106 determines that a user fails multiple times to authenticate himself or herself as valid and recognized user of the system 100, the system server 106 transmit potential fraudulent event (including data associated with the event comprising multiple times failed authentication) to the alert-generating server 102. The alert-generating server 102 then executes an alert-generation model to determine an alert probability score for this event. The alert-generation model executed by the alert-generating server 102 calculates the alert probability score for this event based on historical data. The historical data may include details regarding any previous history of the user for failed authentication events, and whether a device ID from which the user is attempting to log in matches with user device data. The set of one or more acceptable and authorized device IDs of the user are predetermined to satisfy a safety acceptability threshold required by the system 100 and stored in a user record. In operation, in order to verify a device ID obtained from a failed authentication event associated with a user matches with a user record, the alert-generating server 102 may first query a user record hosted by the database 110 or a separate database of the system 100. Upon determining that the device ID is present in a user record, the alert-generating server 102 may automatically determine the creditability of the device ID that is matched to an acceptable device ID in the record.

In yet another example case, the alert-generating server 102 may receive a record of a fraudulent transaction event associated with a user from a system server 106. The fraudulent transaction event may be identified by the system server 106, such as a third-party payment server associated with a payment or transaction system that conducts payment or transactions operated by payment services system. The system server 106 may identify such fraudulent transaction event when transaction amount is above a threshold amount or an average amount to computing devices. The system server 106 may publish payment status records and transaction information in a record associated with the user in the database 104. Upon receiving a record of the fraudulent transaction event associated with the user, the alert-generating server 102 may execute an alert-generation model to determine an alert probability score of the fraudulent transaction event. The alert-generation model may use historical data associated with the user to determine the alert probability score of the fraudulent transaction event. When the calculated alert probability score is greater than a predefined threshold score, the alert-generating server 102 may generate an alert and cease processing the transaction.

System servers 106 may be computing systems capable of detecting likely fraudulent and/or authentication events. In some embodiments, the system servers 106 may be devices such as a payment server, a webserver, and a security device comprising a processor capable of detecting fraudulent and/or authentication events without limiting the scope of the present disclosure. These computing devices may operate independently or be associated with the alert-generating server 102. However, it should be appreciated that other embodiments may comprise additional or alternative types of devices, or may omit one or more of the system servers 106 described herein.

The system servers 106 may be coupled to the alert-generating servers 102 via a network 112. In some instances, the system server 106 may be within logical boundaries of an enterprise network, such as a webserver, or may be a gateway device, such as a network security device (e.g., firewall, proxy server). Additionally, in some cases, a system server 106 may be a device that is external to the enterprise network, such as a payment server (e.g., FedWire, SWIFT, ACH). The system servers 106 may detect fraudulent and/or authentication events containing data that is associated with a communication channel and type of the system servers 106. For example, a system server 106 such as a payment server may detect a fraudulent and/or authentication event containing data related to money transfers or transaction requests, such as account identifiers, user identifiers, and the amount of money at issue.

A system server 106 such as a payment server may be a server computer associated with a payment or transaction system that conducts payment or transactions operated by payment services systems, such as the Society for Worldwide Interbank Financial Telecommunication (SWIFT), Fedwire, and the Automated Clearing House (ACH), among others. The payment server may be external to the enterprise system 100 and may be coupled via a network 112 to the alert-generating server 102, network nodes, or other computing devices internal to the enterprise system 100. The third-party payment server may publish payment status records of users and transmit fraudulent and/or authentication events indicating various transaction information according to certain thresholds or predetermined rules, such as detect a fraudulent and/or authentication event when an irregular transaction amount is identified above a threshold amount or an average amount to alert-generating servers 102 or other servers of the system 100. The events may be transmitted to the alert-generating servers 102 and/or subscribing computing devices over a network 112, such as Internet Protocol (IP) based networks and/or telecommunications networks, and formatted with particular data structures according to the particular standards used by the system 100 hosting the payment server.

In some embodiments, the alert-generating server 102 may monitor or otherwise subscribe to fraudulent and/or authentication events generated and published by the payment server. The payment server may communicate the fraudulent and/or authentication events with the alert-generating server 102 over the network 112, using any number compatible data formats and protocols. The fraudulent and/or authentication events may indicate a status of payments transactions, such as an irregular transaction amount is identified above a threshold amount or an average amount. The alert-generating server 102 may use the fraudulent and/or authentication events data to update user transaction records stored in a database 104 and generate alerts based on these new fraudulent and/or authentication events. In some cases, the fraudulent and/or authentication events and/or transaction data that the alert-generating server 102 receives from the payment server may trigger execution of alert generation that further instruct the alert-generating server 102 to execute one or more processes, such as generating and transmitting notifications to analysts devices 108 and updating records in the database 104, among other processes.

A system server 106 such as a webserver may be any computing device hosting a website accessible to user devices 110 via the Internet. The webserver may be any computing device comprising a processor and a non-transitory machine-readable storage media capable of executing the various tasks and processes described herein. Non-limiting examples of such computing devices may include workstation computers, laptop computers, server computers, laptop computers, and the like. The webserver may execute software applications configured to host a website (e.g. Microsoft IIS®), which may generate and serve various webpages to the user devices 110. The website may be used to generate and access data stored on a database 104. In some implementations, a webserver may be configured to require user authentication based upon a set of user authorization credentials (e.g., user name, password, biometrics, cryptographic certificate).

The webserver may access the database 104 configured to store user credentials in an user behavioral profile, which the webserver may be configured to reference in order to determine whether a set of entered credentials purportedly authenticating the user match an appropriate set of credentials that identify and authenticate the user. Similarly, in some implementations, a webserver may generate and serve webpages to the user devices 110 based upon a user role within the system 100. In such implementations, a user role may be defined by data fields in a user behavioral profile record stored in the database 104, and authentication of the user and user role may be conducted by the webserver by executing an access directory protocol. The webserver may then be instructed to generate webpage content, access or generate data stored in the database 104, according to a user role defined by a user record in the database 104.

In some embodiments, as the webserver may require users to authenticate using credentials that identify a user as a valid user of the system 100, the webserver may generate fraudulent and/or authentication events related to user's interactions with the website hosted by the webserver. For example, the webserver may generate an event indicating a failed authentication attempt received from a user device 110. As another example, a webserver may generate an event when the user performs or otherwise requests unusual actions. For instance, a user may open multiple new accounts associated with a user identifier, or the user may move unusually large amounts of money between accounts or to accounts at a different financial institution.

The webserver or other servers of the system 100 may generate a fraud model for typical or atypical behaviors of the particular user. The fraud model, for example, may indicate an average or threshold amount of money that may be involved in a transaction based on an average amount that the user moves or based on a preset amount inputted by the user or system administrator. The above-mentioned are only examples that may be detected by the webserver, and the webserver may detect the fraudulent and/or authentication events for any number of interactions with the website.

In some embodiments, a webserver, or other servers of the system 100, may generate records for an interaction between the user device 110 and the webserver. A record may contain data fields related to the interaction, such as a user identifier and source device information identifying the user device 110 (e.g., IP address, device ID). The webserver may store the records locally in a behavior profile of the user or in a database 104 hosted on any server within the system 100. The webserver may capture data for the interaction between the user device 110 and the webserver at different times of the interactions, such as capturing source device information from header portions of IP packets, or user identifier information from an authentication attempt.

A system server 106 such as a security device may be any computing device that supports network security and network traffic management efforts. Non-limiting examples of security device may include a proxy server, a firewall, an intrusion detection device, and the like. The security device may detect a fraudulent event while performing a security function, such as checking data traffic from a particular source IP address or device, based on configurations of the security device. In some embodiments, a security device may be a proxy server that may be a computing device, such as a server, configured to manage network communications between user devices 110 and external resources accessible via a network 112, such as websites or web-based applications hosted on servers of the system 100. The proxy server may provide a proxy gateway in effect when the communications inside or outside of the system 100 are prohibited. The proxy server may receive web-service queries from plural user devices 110 and operates to transfer the received web-service queries to external servers for providing a target service the user devices 110 would like to reach.

In some implementations, the proxy server may receive a web-service query from the user devices 110. The proxy server uses the IP address that corresponds to the physical address of the user devices 110 for the communications with the user devices 110. The proxy server may have a function of relaying a user's access to a resource or the data of a website, for example. The user devices 110 communicate with the proxy server without direct communications with the external servers. The proxy server may review and filter data traffic with web-based resources, provide anonymity to user devices 110, and log data traffic (e.g., inbound and outbound web-service requests). During operation, the proxy server may capture header information regarding the source user device 100 to determine whether to permit or block incoming data traffic based on which the security device, such as the proxy server, may detect a fraudulent event and then transmit the detected event to the alert-generating server 102.

User devices 110 may be any computing and/or telecommunication devices comprising a processor and capable of performing the various tasks and processes described herein, such as accessing system servers 106 and providing a GUI interface to a user to interact with a user-centric website hosted on the system servers 106. Non-limiting examples of a user device 110 may include a telephone 110*a* (e.g., POTS landline telephone, cellular telephone, smartphone), a user computer 110*b* (e.g., desktop, laptop, server, tablet), or any other telecommunications or computing device used to communicate with enterprise services.

In some embodiments, a user device 110 may be any computing device allowing a user to interact with the system servers 106. The user device 110 may execute an Internet browser or local application that access system servers 106 such as a webserver in order to issue requests or instructions to the system servers 106 to access one or more service applications hosted by the system 100. The user device 110 may transmit credentials from user inputs to the system server 106 such as webserver, from which the system server 106 may authenticate the user. One having skill in the art would appreciate that the user device 110 may comprise any number of input devices configured to receive any number of data inputs (e.g., mouse, keyboard, touchscreen, stylus), including various types of data inputs allowing for authentication, e.g., user name, passwords, certificates, biometrics. One having skill in the art would also appreciate that the user device 110 may be any computing device comprising a processor and non-transitory machine-readable storage medium allowing the user device 110 to perform the various tasks and processes described herein.

Database 104 may be hosted on any server of the system 100 such as the alert-generating server 102 and is capable of storing the fraudulent events and alerts in plain format and/or encrypted version containing data fields that are associated with a communication channel and type of alerts. The database 104 may be in communication with a processor of the alert-generating server 102, where a processor is capable of executing the various commands of the system 100. In some embodiments, the database 104 may be part of the alert-generating server 102. In some embodiments, the database 104 may be a separate component in communication with the alert-generating server 102 and/or other devices of the system 100.

The database 104 may be in communication with the alert-generating server 102 via a network 112 and include a non-transitory machine-readable storage media capable of receiving and storing fraudulent events and alerts. The database 104 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the alert-generating server 102 and/or other components of the system 100.

The database 104 may also store behavior profile records of users and/or other records that may comprise data describing users, e.g., user data, such as user credentials (e.g., user name, passwords, biometrics, encryption certificates), user account data, user roles, or user permissions; document records that may comprise machine-readable computer files (e.g., word processing files), parsed portions of such computer files, or metadata associated with computer files; and application data that may include software instructions executed by the alert-generating server 102 and/or other components of the system 100 or data used by the such applications executed by the alert-generating server 102 and/or other components of the system 100.

Administrator devices 108 may be computing devices that fraud analysts may use to process alerts associated with fraud or security threats. An administrator device 108 may be any computing device comprising a processor and capable of performing various tasks and processes described herein. Non-limiting examples of the administrator device 108 may include laptops, desktops, servers, tablets, and smartphones. An administrator device 108 may be coupled via one or more internal or external networks 112 to a database 104. Software executed by the administrator device 108 permits an analyst to select an alert from the database 104 and then review the selected alert.

The administrator device 108 GUI may receive alerts that are related to subject matter (e.g., type of threat) or procedural role (e.g., time-sensitive threat) of the respective analyst. In some implementations, alerts may have a data field indicating identifying the nature of the potential threat and another data field indicating a time-sensitive nature or user-sensitive nature of the potential threat. Based on this data field, the administrator device 108 may receive alerts having subject matter or procedural data fields associated with the analyst credentials. For instance, the analyst credentials of an analyst specializing in time sensitive integrate alerts would indicate to the administrator device 108 that the administrator device 108 should retrieve and present alerts having a data field indicating that the particular alert is time sensitive.

FIG. 2 shows execution steps of generating alerts based on fraudulent and malicious network activity, according to an exemplary method 200. The exemplary method 200 shown in FIG. 2 comprises execution steps 202, 204, 206, 208, 210, 212, and 214. However, other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer, referred to as the alert-generating server in this exemplary embodiment. However, in some embodiments, these steps may be executed by any number of computing devices operating in a distributed computing environment. In some cases, a computer executing one or more steps may be programmed to execute various other, unrelated features, where such computer does not need to be operating strictly as the alert-generating server described herein.

In a first step 202, the alert-generating server generates an alert-generation model corresponding to each user. In some embodiments, any server of a system may generate the alert-generating model. The alert-generating server may generate the alert-generation model using one or more inputs from a behavior profile of each user of a system. In some embodiments, the alert-generating server may generate an alert-generation model applicable to all users using one or more inputs from a behavior profile of each user of a system. In some embodiments, the alert-generating server may generate an alert-generation model applicable for each user using one or more inputs from a behavior profile of a particular user.

To generate an alert-generation model corresponding to each or all users, the alert-generating server or any other server of a system may first generate a behavior profile of each user of the system using personal data, financial data, and social network data of the user. To generate the behavior profile of the user, the alert-generating server or any other server of the system may obtain personal data, financial data, and social network data from internal and external databases of the system. The alert-generating server or any other server of the system may use a record of events previously undertaken by the user in an account of the user to generate a behavior profile of each user. The events may include, but not limited to, transfer funds, open a new account, withdraw funds, check funds, etc. in his/her account.

One or more servers of the system may monitor each user events in real-time, and transmit details of new events to the alert-generating server. The alert-generating server on receiving the new events related to the user, updates a behavior profile associated with the user based on the data associated with the new events. Upon updating of the behavior profile associated with the user, the alert-generating server also updates the alert-generation model corresponding to the user. In some embodiments, based on updating of the behavior profile associated with one user because of one or more specific events, the alert-generating server may update the alert-generation model corresponding to all users of the system upon determining that the one or more specific events may be applicable for all users of the system.

In a next step 204, the alert-generating server receives one or more fraud events from one or more fraud detection devices. The fraud events may include, but not limited to, online and/or offline fraudulent activity. For example, an account takeover fraud event when someone steals the account access credentials such as username, password, PIN, etc. of an account owner and then cover-ups as a user and accesses account. Upon detecting the fraudulent activity, the fraud detection devices determine data fields associated with the fraudulent activity such as money transfers or transaction requests, account identifiers, user identifiers, a timestamp, an amount of money at issue, location of event, and source device identifier.

The fraud detection devices may be any computing device comprising a processor capable of executing one or more fraud detection algorithms to detect fraudulent and/or malicious events associated with a particular type of fraud or attack based on one or more scenario attribute models corresponding to fraud scenarios. The fraud detection devices may be coupled to the alert-generating server via one or more networks and networking devices. In some instances, the fraud detection devices may be a webserver, a payment server, a network security device capable of detecting fraudulent and/or malicious events based on the one or more scenario attribute models. In some embodiments, the fraud detection devices may be configured to detect fraudulent and/or malicious events based on the one or more scenario attribute models, and associate the fraudulent and/or malicious events with data fields that are associated with a communication channel and type of the fraud detection device. For example, a payment server may detect event related to money transfers or transaction requests, and then the payment server associate the event with account identifiers, a timestamp, and the amount of money at issue.

Upon detecting fraudulent and/or malicious events, the fraud detection devices transmit a notification message to the alert-generating server indicating details of the fraudulent and/or malicious events. The notification may be in any number of data formats and may be transmitted to the alert-generating server and any number of devices of the system through the associated networks and channels. Non-limited examples of the corresponding notification transmission channels may include any number of IP-based computer networks and/or telecommunications networks. Non-limiting examples of data formats of the notification message may include application-specific notifications, and e-mails, among others.

In a next step 206, the alert-generating server determine a user identifier associated with a fraud event of the one or more fraud events based on the data associated with the fraudulent activity. The data associated the fraudulent activity may include details such as money transfers or transaction requests, account identifiers, user identifiers, a timestamp, an amount of money at issue, location of event, and source device identifier. Based on the data, the alert-generating server generate a query using the data as inputs, and transmit the query to a database to determine identification details of a user whose account is undergoing a fraudulent activity. Upon obtaining the identification details of the user, in a next step 208, the alert-generating server may determine an alert-generation model applicable to the fraud event based on the identification information of the user associated with the fraud event. In some embodiments, one or more alert-generation models may be associated with one or more users. A relationship table showing the association of the one or more alert-generation models with the one or more users may be stored in a database. The alert-generating server may determine a particular alert-generation model applicable for a particular user upon processing identification information corresponding to the particular user. In some embodiments, one or more alert-generation models may be associated with one or more events. A relationship table showing the association of the one or more alert-generation models with the one or more events may be stored in a database. The alert-generating server may determine a particular alert-generation model applicable for a particular event upon processing information corresponding to the particular event. In some embodiments, one or more alert-generation models may be associated with one or more events related to one or more users. A relationship table showing the association of the one or more alert-generation models with the one or more events related to the one or more users may be stored in a database. The alert-generating server may determine a particular alert-generation model applicable for a particular event associated to a particular user to upon processing information corresponding to the particular event and the particular user.

In a next step 210, the alert-generating server may generate an alert probability score corresponding to the fraud event. The alert-generating server may generate the alert probability score corresponding to the fraud event based on the execution of the alert-generation model applicable to the fraud event. The alert-generating server may determine the alert-generation model applicable to the fraud event based on a user identifier associated with the fraud event. For example, each user has their own corresponding alert-generating model based on their respective profile, activities, events, and behavior. Upon determining the user identifier such as a user name associated with the fraud event, the alert-generating server determines the alert-generation model applicable for the particular user from a table record of the user within in a database. In some embodiments, the alert-generating server may determine the alert-generation model applicable to the fraud event based on one or more attributes of the fraud event. For example, based on analysis of the one or more attributes of the fraud event by the alert-generating server, the alert-generating server may determine a fraud applicable model that may be applicable for such fraud events.

In some embodiments, upon the determination of the fraud probability score corresponding to the fraud event, the alert-generating server may update the one or more fraud detection algorithms by modifying the one or more fraud scenarios based on the alert probability score corresponding to each fraud event.

In some other embodiments, upon the determination of the fraud probability score corresponding to the fraud event based on the execution of the alert-generation model applicable to the fraud event, in a next step 212, the alert-generating server may compare the fraud probability score corresponding to the fraud event with a pre-defined threshold score. In some embodiments, a pre-defined threshold score may be based on a profile of a user on whose account the fraud event has been detected. In some embodiments, a pre-defined threshold score may be based on one or more attributes of fraud event such as illegal fund transfer request or probable unauthorized access of the account.

In some embodiments, upon determining that the alert probability score corresponding to the fraud event does not exceed the pre-defined threshold score, the alert-generating server generate one or more instructions to process a request associated with the fraudulent activity. The alert-generating server may transmit the one or more instructions to one or more other servers of the system, and upon the receipt of the one or more instructions, the one or more other servers of the system execute the request associated with the fraudulent activity and process the transaction activity.

In some embodiments, upon determining that the alert probability score corresponding to the fraud event exceed the pre-defined threshold score, the alert-generating server may generate an alert corresponding to the fraud event. The alert generated by the alert-generating server may include log files and a machine-readable code containing data fields describing a fraud event associated with a data channel of detection of the fraud event.

Upon the generation of the alert for the fraudulent activity, in a next step 214, the alert-generating server may further generate one or more instructions to cease the execution of a request associated with the fraudulent activity. For example, the alert-generating server may transmit the one or more instructions to an administrator device or any other server of the system to cease the execution of a request associated with the fraudulent activity. Subsequently, the alert-generating server may transmit one or more notifications to a user device alerting the user about the fraudulent activity on their account.

The alert-generating server may transmit one or more instructions to an administrator device or any other server of the system to cease execution of a request associated with a fraudulent activity for each alert generated by the alert-generating server based on a fraud probability score corresponding to the alert. For instance, the alert-generating server may sort each alert based on their corresponding fraud probability score. Based on the sorting order of alerts, the alert-generating server may generate instructions corresponding to the alerts, and transmit the instructions to the administrator device to cease execution of the request associated with a fraudulent activity for each alert in the sorted order of the alerts. In other words, the one or more alerts and instructions associated with the one or more alerts are presented on a graphical user interface (GUI) of an administrator device in order of priority as indicated by the relative fraud probability scores.

In some embodiments, upon the generation of the alert for the fraudulent activity, the alert-generating server may update the behavior profile of the user with a record of a fraud event by the user in the account of the user. Upon the updating of the behavior profile of the user, the alert-generating server may further update an alert-generating model associated with the user.

As described above, the alert-generating server may train the alert-generation model using the updated behavior profile. For example, the alert-generating server may represent mathematical functions describing relationships between multiple nodes where each node represent a user attribute within the user's behavior profile. Upon detecting fraud, the alert-generating server may transmit the updated behavior profile for the user to the alert-generation model. Because the updated behavior profile includes new network activity associated with the user, the alert-generation model may reconfigure itself by revising the mathematical functions using a back-propagating method. In some other embodiments, the alert-generating server may also train the alert-generation model when the administrator determines that the alert-generation model has yielded an incorrect fraud probability score and the user is not involved in fraudulent network activity.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
   generating, by a server, an alert-generation model corresponding to each user using at least data from a behavior profile of each user, wherein the behavior profile of the user comprises at least a record of events previously undertaken by the user in an account of the user;
   receiving, by the server, one or more fraud events comprising one or more fraud indicators associated with a fraudulent activity from one or more fraud detection devices, wherein each of the one or more fraud detection devices executes one or more fraud detection algorithms to identify data fields associated with the one or more fraud indicators based on one or more fraud scenarios;

determining, by the server, a user identifier associated with each fraud event based on the data fields associated with the fraudulent activity;
determining, by the server, the alert-generation model applicable to each fraud event based on the user identifier associated with each fraud event;
generating, by the server, the alert probability score corresponding to each fraud event, based on the execution of the alert-generation model applicable to each fraud event determined based on the user identifier associated with each fraud event, on the data fields associated with the fraudulent activity contained in each fraud event;
updating, by the server, the one or more fraud detection algorithms by modifying the one or more fraud scenarios based on the alert probability score corresponding to each fraud event;
generating, by the server, an alert associated with the fraud event upon determining that the alert probability score corresponding to the fraud event exceeds a pre-defined threshold score; and
upon the server generating the alert for the fraudulent activity:
generating, by the server, one or more instructions to cease execution of a request associated with the fraudulent activity; and
updating, by the server, the behavior profile of the user with a record of fraud event in the account of the user, whereby the server trains the alert-generation model using the updated behavior profile.

2. The server-implemented method according to claim 1, wherein an alert comprises log files and a machine-readable code containing data fields describing a fraud event associated with a data channel.

3. The server-implemented method according to claim 1, wherein upon the server generating the alert for the fraudulent activity:
transmitting, by the server, one or more instructions to an administrator device to cease the execution of the request associated with the fraudulent activity.

4. The server-implemented method according to claim 1, wherein upon the server generating the alert for the fraudulent activity:
transmitting, by the server, one or more notifications to a user device alerting the user about the fraudulent activity in their account.

5. The server-implemented method according to claim 1, wherein the one or more fraud detection devices are configured to detect events comprising data field associated with type of the fraud detection device.

6. A server-implemented method comprising:
generating, by a server, an alert-generation model corresponding to each user using at least data from a behavior profile of each user, wherein the behavior profile of the user comprises at least a record of events previously undertaken by the user in an account of the user;
receiving, by the server, one or more fraud events from one or more fraud detection devices, wherein each of the one or more fraud events comprises data fields associated with a fraudulent activity;
determining, by the server, a user identifier associated with a fraud event of the one or more fraud events based on the data fields associated with the fraudulent activity;
determining, by the server, the alert-generation model applicable to the fraud event based on the user identifier associated with the fraud event;
generating, by the server, an alert probability score corresponding to the fraud event, based on the execution of the alert-generation model applicable to the fraud event determined based on the user identifier associated with the fraud event, on the data fields associated with the fraudulent activity contained in the fraud event;
generating, by the server, an alert associated with the fraud event upon determining that the alert probability score corresponding to the fraud event exceeds a pre-defined threshold score; and
upon the server generating the alert for the fraudulent activity:
generating, by the server, one or more instructions to cease execution of a request associated with the fraudulent activity; and
updating, by the server, the behavior profile of the user with a record of fraud event in the account of the user, whereby the server trains the alert-generation model using the updated behavior profile.

7. The server-implemented method according to claim 6, further comprising:
generating, by the server, one or more instructions to process the request associated with the fraudulent activity upon the server determining that the alert probability score corresponding to the fraud event does not exceed the pre-defined threshold score.

8. The server-implemented method according to claim 6, wherein the one or more fraud events associated with a particular type of fraud or attack are determined by the one or more fraud detection devices based on one or more scenario attribute models.

9. The server-implemented method according to claim 6, further comprising:
sorting, by the server, one or more alerts generated for the one or more fraud events according to their corresponding fraud probability score.

10. The server-implemented method according to claim 6, wherein the behavior profile of each user further comprises their personal data, financial data, and social network data, and wherein the behavior profile of each user is stored in their respective record in a non-transitory machine-readable storage media.

11. A system comprising:
a server configured to:
generate an alert-generation model corresponding to each user using at least data from a behavior profile of each user, wherein the behavior profile of the user comprises at least a record of events previously undertaken by the user in an account of the user;
receive one or more fraud events from one or more fraud detection devices, wherein each of the one or more fraud events comprises data fields associated with a fraudulent activity;
determine a user identifier associated with a fraud event of the one or more fraud events based on the data fields associated with the fraudulent activity;
determine the alert-generation model applicable to the fraud event based on the user identifier associated with the fraud event;
generate an alert probability score corresponding to the fraud event, based on the execution of the alert-generation model applicable to the fraud event determined based on the user identifier associated with the fraud event, on the data fields associated with the fraudulent activity contained in the fraud event;

generate an alert associated with the fraud event upon determining that the alert probability score corresponding to the fraud event exceeds a pre-defined threshold score; and upon the server generating the alert for the fraudulent activity:

generate one or more instructions to cease the execution of a request associated with the fraudulent activity; and update the behavior profile of the user with a record of fraud event in the account of the user, whereby the server trains the alert-generation model using the updated behavior profile.

12. The system according to claim 11, wherein an alert comprises log files and a machine-readable code containing data fields describing a fraud event associated with a data channel.

13. The system according to claim 11, wherein the server is configured to:

transmit one or more instructions to an administrator device to cease the execution of the request associated with the fraudulent activity upon the server generating the alert for the fraudulent activity.

14. The system according to claim 11, wherein the server is configured to:

transmit one or more notifications to a user device alerting the user about the fraudulent activity upon the server generating the alert for the fraudulent activity.

15. The system according to claim 11, wherein the one or more fraud detection devices are configured to detect events comprising data fields associated with type of the fraud detection device.

16. The system according to claim 11, wherein the server is configured to:

generate one or more instructions to process the request associated with the fraudulent activity upon the server determining that the alert probability score corresponding to the fraud event does not exceed the pre-defined threshold score.

17. The system according to claim 11, wherein the one or more fraud events associated with a particular type of fraud or attack are determined by the one or more fraud detection devices based on one or more scenario attribute models.

18. The system according to claim 11, wherein the server is configured to:

sort one or more alerts generated for the one or more fraud events according to their corresponding fraud probability score.

19. The system according to claim 18, wherein the server is configured to:

present the one or more alerts on a graphical user interface (GUI) of an administrator device in order of priority as indicated by the relative fraud probability scores.

20. The system according to claim 11, wherein the behavior profile of each user further comprises their personal data, financial data, and social network data, and wherein the behavior profile of each user is stored in their respective record in a non-transitory machine-readable storage media.

* * * * *